United States Patent [19]
Eck et al.

[11] Patent Number: 5,608,011
[45] Date of Patent: Mar. 4, 1997

[54] CROSSLINKABLE POLYMER POWDER COMPOSITIONS

[75] Inventors: Herbert Eck, Burghausen; Peter Ball; Hermann Lutz, both of Emmerting; Heinrich Hopf, Burghausen, all of Germany

[73] Assignee: Wacker-Chemie GmbH, Munich, Germany

[21] Appl. No.: 526,537

[22] Filed: Sep. 11, 1995

[30] Foreign Application Priority Data

Sep. 15, 1994 [DE] Germany ............... 44 32 899.0

[51] Int. Cl.⁶ ............... C08C 19/20; C08F 8/34; C08K 5/41; C08K 3/30
[52] U.S. Cl. ............... 525/344; 525/345; 524/419; 524/173
[58] Field of Search ............... 524/419, 555, 524/556, 563, 904, 415, 416, 417, 423; 525/934, 387, 340, 344, 345; 526/222, 227, 229, 233–234, 310, 303.1

[56] References Cited

U.S. PATENT DOCUMENTS

| | | | |
|---|---|---|---|
| 4,118,357 | 10/1978 | Brabetz et al. | 260/29.6 WA |
| 5,219,969 | 6/1993 | Uhl et al. | 526/304 |
| 5,296,532 | 3/1994 | Haerzschel et al. | 524/398 |
| 5,496,882 | 3/1996 | Aydin et al. | 524/458 |

FOREIGN PATENT DOCUMENTS

| | | |
|---|---|---|
| 0394774 | 10/1990 | European Pat. Off. . |
| 2222033 | 11/1973 | Germany . |
| 2620738 | 12/1977 | Germany . |
| 3143070 | 5/1983 | Germany . |
| 3942628 | 6/1991 | Germany . |

OTHER PUBLICATIONS

Derwent Abstract AN 83–46975K.
Derwent Abstract AN 73–73217U.

*Primary Examiner*—Peter A. Szekely
*Attorney, Agent, or Firm*—Burgess, Ryan and Wayne

[57] ABSTRACT

The invention relates to water-dispersible or water-soluble polymer powder compositions which can be crosslinked or condensed by acid and comprises I) one or more pulverulent water-dispersible or water-soluble copolymers which can be crosslinked or condensed by acid, II) one or more pulverulent water-dispersible or water-soluble compounds from the group consisting of alkali metal or ammonium peroxo acid salts, and III) one or more pulverulent water-dispersible or water-soluble reducing agents.

12 Claims, No Drawings

CROSSLINKABLE POLYMER POWDER COMPOSITIONS

BACKGROUND OF THE INVENTION

1) Field of the Invention

The invention relates to crosslinkable polymer powder compositions, to processes for their preparation and to their use.

2) Background Art

In practice, it is often advantageous if the user is provided with ready-to-use systems or mixtures, for example, as adhesives or coating compositions. This applies, for example, to water-soluble or water-dispersible solid adhesives or coating compositions which crosslink in the presence of strong acids. If crosslinking is effected by splitting off water, such systems comprising crosslinkable binder and acid in the anhydrous state are particularly susceptible to premature crosslinking.

Although there are a number of potent compounds in solid form which are not or are only very weakly hygroscopic and give a strongly acid reaction in the presence of water such as, for example, $AlCl_3 \times 6H_2O$, $NaAlCl_4$ and $Cr(NO_3)_2 \times 9H_2O$, all these have one thing in common: traces of water are sufficient to liberate acid which then triggers the crosslinking reaction. The shelf life of such mixtures is therefore very limited since, in the case of the products in question, complete exclusion of water (or other proton-containing solvents such as alcohols) is possible only with difficulty and in many cases, is not possible at all.

Examples of aqueous dispersions of copolymers which can be crosslinked in the presence of acids or metal salts are mentioned in DE-A 2620738 (U.S. Pat. No. 4,118,357) and DE-A 3942628 (U.S. Pat. No. 5,296,532). These are aqueous dispersions of vinyl ester copolymers with N-methylol functional groups which comprises $H_2O$ soluble metal salts or acids such as HCl or $HNO_3$, as the hardener additive. Water-redispersible powders of plastics which are accessible by drying such dispersions can be obtained in anhydrous form only with difficulty. If drying of aqueous polymer dispersions is too intense, the redispersibility of the polymer powders is adversely influenced. Furthermore, the dispersion powders have a protective colloid content; the usual protective colloids such as polyvinyl alcohol, starch, starch derivatives or cellulose derivatives containing reactive protons which liberate acid from the hardener salts mentioned which, in the end, again leads to premature crosslinking of copolymers.

There was therefore the object of providing water-dispersible or water-soluble polymer powder compositions which can be crosslinked or condensed by acid, do not tend to undergo premature crosslinking or condensation even with a residual moisture content contained in the powder composition, and only crosslink when the powder composition is dispersed or dissolved in water.

SUMMARY OF THE INVENTION

The invention relates to water-dispersible or water-soluble polymer powder compositions which can be crosslinked or condensed by acid and comprise I) one or more pulverulent water-dispersible or water-soluble copolymers which can be crosslinked or condensed by acid, II) one or more pulverulent water-dispersible or water-soluble compounds from the group consisting of alkali metal or ammonium peroxo acid salts, and, III) one or more pulverulent water-dispersible or water-soluble reducing agents.

DESCRIPTION OF THE PREFERRED EMBODIMENTS

Suitable copolymers I) which can be condensed by acid and are either in the form of water-soluble powders or in the form of water-dispersible powders are the arene and amino resins, in particular, the phenolic resins, novolaks and resols and polymers with carbonyl groups such as urea-formaldehyde resins and melamine-formaldehyde resins or copolymers with thio-carbonyl groups.

Suitable copolymers I) which can be crosslinked by acid are copolymers which have a $T_g$ of –60° C. to +60° C. and comprise a) one or more monomer units from the group consisting of vinyl esters of unbranched or branched alkyl-carboxylic acids having 1 to 15 C atoms, esters of acrylic acid and methacrylic acid with unbranched or branched alcohols having 1 to 12 C atoms, mono- or diesters of fumaric acid or maleic acid with unbranched or branched alcohols having 1 to 12 C atoms, dienes, vinyl aromatics, vinyl halides and α-olefins and b) 0.1 to 20.0% by weight, based on the total weight of the copolymer, of one or more crosslinkable monomer units from the group consisting of N-methylolacrylamide (NMA), N-methylolmethacrylamide (NMMA), N-(alkoxymethyl) acrylamides, N-(alkoxymethyl)-methacrylamides or N-(alkoxymethyl) (meth) allylcarbamates with a $C_1$- to $C_6$-alkyl radical, esters of N-methylol (meth)acrylamide and N-methylol (meth)-allylcarbamates with to $C_1$- to $C_6$-alkylcarboxylic acids, acrylamidoglycolic acid (AGA) and methacrylamido-glycolic acid methyl ester (MAGME).

Preferred vinyl esters are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having 9 to 10 C atoms, for example VeoVa9$^R$ and VeoVa10$^R$. Vinyl acetate is particularly preferred.

Preferred ackyl methacrylic acid esters or acrylic acid esters are methyl acrylate, methyl methacrylate, ethyl acrylate, ethyl methacrylate, propyl acrylate, propyl methacrylate, n-butyl acrylate, n-butyl methacrylate and 2-ethylhexyl acrylate. Methyl acrylate, methyl methacrylate, n-butyl acrylate and 2-ethylhexyl acrylate are particularly preferred.

Preferred esters of fumaric and maleic acid are the dimethyl, diethyl, diisopropyl and dibutyl esters thereof. Preferred dienes are butadiene and isoprene. Preferred vinyl aromatics are styrene, methylstyrene and vinyltoluene. Vinyl chloride is preferred as a vinyl halide. Preferred α-olefins are ethylene and propylene.

If appropriate, the vinyl ester copolymers can comprise 1.0 to 50% by weight, based on he total weight of the comonomer phase, of comonomer units derived from α-olefins such as ethylene or propylene, and/or vinyl aromatics such as styrene, and/or vinyl halides, such as vinyl chloride, and/or acrylic acid esters of methacrylic acid esters of alcohols having 1 to 12 C atoms such as methyl acrylate, methyl methacrylate, ethyl acrylate, ethyl methacrylate, propyl acrylate, propyl methacrylate, n-butyl acrylate, n-butyl methacrylate and 2-ethylhexyl acrylate, and/or ethylenically unsaturated dicarboxylic acid esters or derivatives thereof such as diisopropyl fumarate and the dimethyl, dibutyl and diethyl esters of maleic acid and fumaric acid, or maleic anhydride,. The choice from the monomers mentioned is preferably made such that copolymers having a glass transition temperature $T_g$ of −30° C. to +30° C. are obtained.

If appropriate, the (meth)acrylic acid ester copolymers can comprise 1.0 to 50% by weight, based on the total weight of the comonomer phase, of comonomer units derived from α-olefins such as ethylene or propylene and/or vinyl aromatics, such as styrene and/or vinyl halides such as vinyl chloride, and/or ethylenically unsaturated dicarboxylic acid esters or derivatives thereof such as diisopropyl fumarate and the dimethyl, dibutyl and diethyl esters of maleic acid or fumaric acid, or maleic anhydride. The choice from the monomers mentioned is preferably made such that copolymers having a glass transition temperature $T_g$ of −30° C. to +30° C. are obtained.

If appropriate, the vinyl ester copolymers and the (meth)acrylic acid ester copolymers also comprise 0.05 to 10.0% by weight, based on the total weight of the comonomer mixture, of one or more auxiliary monomers from the group consisting of ethylenically unsaturated carboxylic acids, preferably acrylic acid or methacrylic acid, from the group consisting of ethylenically unsaturated carboxylic acid amides, preferably acrylamide and 2-acrylamidopropanesulfonic acid, from the group consisting of ethylenically unsaturated sulfonic acids and salts thereof, preferably vinylsulfonic acid, from the group consisting of poly-ethylenically unsaturated comonomers, for example divinyl adipate, 1,9-decadiene, allyl methacrylate and triallyl cyanurate, and from the group consisting of silicon-containing ethylenically unsaturated compounds, such as γ-acryl-and γ-methacryloxypropyltri-(alkoxy)silanes and vinyltrialkoxysilanes, the alkoxy groups contained in the comonomers being, for example, methoxy, ethoxy, methoxyethylene, ethoxyethylene, methoxypropylene glycol ether or ethoxypropylene glycol ether radicals.

Preferred vinyl ester copolymers comprise as comonomer units a), in each case based on the total of the copolymer:
90 to 99% by weight of vinyl ester, in particular vinyl acetate; 49.9 to 98.9% by weight of vinyl ester, in particular vinyl acetate, and 1 to 50% by weight of α-olefin, in particular ethylene;
40 to 80% by weight of vinyl acetate, 5 to 45% by weight of vinyl laurate or a vinyl ester of an α-branched carboxylic acid, in particular VeoVa9® and/or VeoVa10®, and 0 to 40% by weight of ethylene;
70 to 98.9% by weight of vinyl acetate and 1 to 30% by weight of a vinyl ester of an α-branched carboxylic acid, in particular, VeoVa9® and/or VeoVa10®; VeoVa9 and VeoVA10 are vinyl esters of highly branched saturated mono-carboxylic acid mixtures containing 9 and 10 carbon atoms respectively produced by Shell.
70 to 98.9% by weight of vinyl ester, in particular, vinyl acetate, and 1 to 30% by weight of (meth)acrylic acid ester, in particular, ethyl acrylate, n-butyl acrylate or 2-ethylhexyl acrylate; 50 to 75% by weight of vinyl acetate, 1 to 30% by weight of acrylic acid ester, in particular n-butyl acrylate or 2-ethylhexyl acrylate, and 1 to 40% by weight of ethylene;
30 to 75% by weight of vinyl acetate, 1 to 30% by weight of a vinyl ester of an α-branched carboxylic acid, in particular, VeoVa9® and/or VeoVa10®, 1 to 30% by weight of acrylic acid ester, in particular, n-butyl acrylate or 2-ethylhexyl acrylate, and 1 to 40% by weight of ethylene;
15 to 70% by weight of a vinyl acetate, 25 to 80% by weight of vinyl chloride and 4 to 40% by weight of vinyl laurate; 40 to 80% by weight of vinyl chloride, 9 to 35% by weight of ethylene, 10 to 45% by weight of vinyl laurate and 0 to 40% by weight of vinyl acetate;
20 to 80% by weight of vinyl chloride, 19 to 40% by weight of ethylene and 0 to 60% by weight of one or more monomers from the group consisting of vinyl acetate, n-butyl acrylate and 2-ethylhexyl acrylate;
20 to 60% by weight of vinyl acetate, 30 to 60% by weight of dibutyl or di-2-ethylhexyl maleate or fumarate and 0 to 40% by weight of vinyl laurate; or
20 to 69% by weight of vinyl acetate, 0 to 30% by weight of ethylene and 10 to 40% by weight of one or more monomers from the group consisting of diisopropyl maleate, diisopropyl fumarate, di-t-butyl maleate, di-t-butyl fumarate; methyl t-butyl maleate and methyl t-butyl fumarate.

Preferred (meth) acrylic acid ester copolymers comprise as comonomer units a), in each case based on the total weight of the copolymer:
90 to 99.9% by weight of n-butyl acrylate and/or 2-ethylhexyl acrylate;
40 to 59.9% by weight of methyl methacrylate and 59.9 to 40% by weight of n-butyl acrylate and/or 2-ethylhexyl acrylate;
50 to 77% by weight of ethyl acrylate and 3 to 40% by weight of methacrylic acid; or
40 to 64.9% by weight of styrene and 35 to 59.9 by weight of n-butyl acrylate and/or 2-ethylhexyl acrylate.

Preferred comonomer units b) are N-methylolacrylamide, N-methylolmethacrylamide, N-(isobutoxy-methyl)acrylamide (IBMA) and N-(n-butoxymethyl)acrylamide (NBMA). The copolymers preferably comprise 0.5 to 3.0% by weight of comonomer units b), based on the total weight of the copolymer.

The polymerization is preferably carried out by the emulsion polymerization process; it can also be carried out by means of the block or the solution polymerization process. In the latter two processes, the copolymers dissolved in organic water-insoluble solvents are dispersed in water with the aid of the protective colloids mentioned below and if appropriate, with emulsifiers, and the dispersion is spray dried, if appropriate, after addition of further additives.

The emulsion polymerization process which is mentioned as preferred, is carried out in an open reaction vessel or in pressure vessels, preferably in a temperature range from 0° to 100° C., and is initiated by the methods usually employed for emulsion polymerization. The initiation is effected by means of the customary water-soluble agents which form free radicals which are preferably employed in amounts of 0.01 to 1.0% by weight, based on the total weight of the monomers. Examples of these are ammonium and potassium persulfate and alkyl hydroperoxides such as tertbutyl hydroperoxide, and hydrogen peroxide. If appropriate, the free radical initiators mentioned can also be combined in a known manner with 0.01 to 0.5% by weight, based on the total weight of the monomers, of reducing agents. Suitable examples are formaldehyde-sulfoxylate salts sodium bisulfite or ascorbic acid. In the case of redox initiation, preferably one or both of the redox catalyst components are metered in during the polymerization.

The polymerization can be carried out discontinuously or continuously, with or without the use of seed latices, with all the constituents or individual constituents of the reaction mixture being initially introduced into the reaction vessel, or with the constituents or individual constituents of the reaction mixture being initially introduced in part into the reaction vessel and subsequently metered in or by the metering process without initial introduction of constituents. All the metering operations are preferably carried out at the rate at which the particular component is consumed.

In a preferred embodiment, 10 to 25% by weight of the comonomers a) is initially introduced into the reaction vessel and the remainder is metered together with the comonomers b) in emulsion. Copolymerization with ethylene is preferably carried out under a pressure of 20 to 100 bar absolute.

Dispersing agents which can be employed are all of the emulsifiers and protective colloids usually used for emulsion polymerization. 0 to 4% by weight, based on the total weight of the monomers, of emulsifier is preferably employed. Suitable examples are anionic surfactants such as alkyl sulfates having a chain length of 8 to 18 C atoms, alkyl and alkylaryl ether sulfates having 8 to 18 C atoms in the hydrophobic radical and up to 40 ethylene oxide or propylene oxide units, alkyl- or alkylarylsulfonates having 8 to 18 C atoms and esters and half-esters or sulfosuccinic acid with monohydric alcohols or alkylphenols. Suitable nonionic surfactants are, for example, alkyl polyglycol ethers or alkylaryl polyglycol ethers having 8 to 40 ethylene oxide unites.

Protective colloids are preferably employed as dispersing agents, in general, in amounts of up to 10% by weight based on the total weight of the monomers. Examples of these are vinyl alcohol/vinyl acetate copolymers having a content of 80 to 100 mol % of vinyl alcohol units, polyvinyl pyrrolidones having a molecular weight of 5,000 to 400,000, celluloses substituted by hydroxyethyl, carboxymethyl, hydroxypropyl and/or methyl and having a degree of substitution range from 1.5 to 3, water-soluble starches and starch derivatives, and other water-soluble polysaccharides or water-soluble derivatives thereof, and furthermore phenol- and naphthalene-formaldehydesulfonates, styrene/maleic acid and vinyl ether/maleic acid copolymers, and water-soluble proteins, such as casein and gelatin.

The pH range desired for the polymerization, which is in general between 3 to 7, can be established in a known manner by acids, bases or customary buffer salts such as alkali metal phosphates or alkali metal carbonates. The regulators usually used, for example mercaptans, aldehydes and chlorohydrocarbons, can be added during the polymerization to establish the molecular weight.

The solids content of the aqueous dispersions is preferably 20 to 60% by weight.

To prepare the dispersion powder, the dispersion is dried, preferably spray dried or freeze dried, particularly preferably spray dried. The known devices can be resorted to here, such as, for example, spraying through one-, two- or multi-component nozzles or with a rotating disk, in a dry stream of gas, which is heated if appropriate. In general, the exit temperatures are in the range from 55 to 100° C., preferably 70 to 90° C., depending on the apparatus, the $T_g$ the copolymer and the desired degree of drying.

In the case of spray drying, if appropriate, a mixture of the aqueous dispersion having a solids content of preferably 20 to 60% by weight and of further additives can be sprayed and dried together.

In a preferred embodiment, 8 to 50% by weight, preferably 10 to 25% by weight, of protective colloid, based on the copolymer weight, is added to the dispersion, preferably in the form of an aqueous solution, before the spray drying. Examples of suitable protective colloids are polyvinyl alcohols and derivatives thereof; polysaccharides in water-soluble form such as starches, cellulose and carboxymethyl, methyl, hydroxyethyl and hydroxypropyl derivatives thereof; synthetic polymers, such as poly(meth)acrylic acid, poly(meth)acrylamide, polyvinylsulfonic acids and water-soluble copolymers thereof; melamine-formaldehydesulfonates, and styrene/maleic acid and vinyl ether/maleic acid copolymers.

Other constituents which can be added to the dried copolymer are emulsifiers which are not soluble in the protective colloids employed, as well as antiblocking agents such as Ca carbonate or Mg carbonate, talc, gypsum, silicic acid and silicates having particle sizes preferably in the range of from 5 nm to 10 µm.

After the drying operation, the crosslinkable copolymers I) are in the form of water-redispersible or water-soluble powders, if appropriate as a mixture with the antiblocking agents and the other above-mentioned additives.

To prepare the polymer powder composition according to the invention, component II) is admixed to the crosslinkable or condensible copolymers I). The polymer powder composition preferably comprises 0.5 to 10.0% by weight of component I).

Suitable components I) are one or more pulverulent, water-dispersible or water-soluble compounds from the group consisting of alkali metal or ammonium peroxo-acid salts which have a strongly acid action in their reduce form, preferably one or more compounds from the group consisting of alkali metal peroxodisulfate, such as potassium peroxodiphosphate, such as potassium peroxodisphosphate, and ammonium peroxodiphosphate. Ammonium peroxodiphosphate is particularly preferred.

Component III) can also be admixed in the same working operation. The polymer powder composition preferably comprises 0.5 to 10.0% by weight of component III), based on the weight of component I).

Suitable components III) are one or more pulverulent, water-dispersible or water-soluble reducing agents which, in their oxidized form, do not neutralize or severely buffer the acids liberated from the peroxo acid salts; preferably one or more compounds from the group consisting of sulfur compounds having a reducing action such as potassium formaldehyde-sulfoxylate, sodium formaldehyde-sulfoxylate (Bruggolit), alkali metal hydrogen sulfite such as potassium hydrogen sulfite or sodium hydrogen sulfite, alkali metal bisulfite such as sodium bisulfite, dithionite, sodium thiosulfate and formamidinesulfinic acid; sodium hypophosphite; and organic compounds having a reducing action such as glucose and in particular those having an endiol grouping such as ascorbic acid or dihydroxymaleic acid. Sodium formaldehyde-sulfoxylate and ascorbic acid are particularly preferred.

The admixing can be carried out continuously or discontinuously after the drying operation, if appropriate, together with further additives such as antiblocking agents, or else separately.

The water-dispersible or water-soluble polymer powder compositions according to the invention which can be crosslinked or condensed by acid are suitable as binders in fields of use where resistance to water and solvents is also desired, in addition to good adhesion. Examples of these are the use as a coating composition, as an adhesive or as a binder for textiles and paper.

The following examples serve to illustrate the invention further.

Preparation of the polymer powder composition:

A copolymer of 99.2 parts by weight of vinyl acetate and 0.8 parts by weight of N-methylolacrylamide which was prepared by the emulsion polymerization process in the presence of polyvinyl alcohol as a protective colloid was used as the base polymer for the Examples or comparison examples listed in Table 1. After spray drying, a water-redispersible powder which comprised 15 parts by weight of polyvinyl alcohol per 100 parts of copolymer I) existed.

In Examples 1 and 2, polymer powder compositions which also comprised 4 parts by weight of potassium peroxodisulfate as component II) and 2.4 parts by weight of sodium formaldehydesulfoxylate as component III) in addition to 100 parts by weight of copolymer I) were prepared.

In Examples 3 and 4, polymer powder compositions which also comprised 3.4 parts by weight of potassium peroxodisulfate as component II) and 2.7 parts by weight of ascorbic acid as component. III) in addition to 100 parts by weight of copolymer I) were prepared. The composition according to Example 5 corresponded to that of Examples 3 and 4, except that 5 parts by weight of hydrite were additionally also incorporated into the composition as antiblocking agents.

As comparison examples, polymer powder compositions were employed which, in the case of Comparison Examples 1 and 2, comprised only copolymer I) or, as in the case of Comparison Examples 3 and 5, additionally also comprised 6 parts by weight of $AlCl_3 \cdot 6H_2O$ as a hardener salt or, as in the case of Comparison Examples 4 and 6, additionally also comprised 5 parts by weight of $NaAlCl_4$ as a hardener salt.

Testing of the use properties:
Determination of the adhesive strength D 3/3:
Testing was carried out in accordance with European standard DIN EN 204.

diesters of fumaric acid or maleic acid with unbranched or branched alcohols having 1 to 12 C atoms, dienes, vinyl aromatics, vinyl halides and α-olefins and b) 0.1 to 20.0% by weight, based on the total weight of the copolymer, of one or more crosslinkable monomer units selected from the group consisting of N-methylolacrylamide (NMA), N-methytolmethacrylamide (NMMA), N-(alkoxymethyl)acrylamides, N-(alkoxymethyl) methacrylamides or N-(alkoxymethyl) (meth)allyl-carbamates with a $C_1$- to $C_6$-alkylcarboxylic acid, acrylamidoglycolic acid (AGA) and methacrylamidoglycolic acid methyl ester (MAGME) as copolymers I) which can be crosslinked by acid.

3. A polymer powder composition as claimed in claim 2, which comprises as comonomer units a), in each case based on the total weight of the copolymer, a member selected from the group consisting of:

(1) 90 to 99.9% by weight of vinyl ester,
(2) 49.9 to 98.9% by weight of vinyl ester, and 1 to 50% by weight of α-olefin,
(3) 40 to 80% by weight of vinyl acetate, 5 to 45% by weight of vinyl laurate or vinyl ester of an α-branched carboxylic acid, and 0 to 40% by weight of ethylene,
(4) 70 to 98.9% by weight of vinyl acetate and 1 to 30% by weight of vinyl ester of an α-branched carboxylic acid,

TABLE 1

| Powder composition | Examples | | | | | Comparison Examples | | | | | |
|---|---|---|---|---|---|---|---|---|---|---|---|
| (parts by weight) | 1 | 2 | 3 | 4 | 5 | 6 | 7 | 8 | 9 | 10 | 11 |
| Copolymer | 100 | 100 | 100 | 100 | 100 | 100 | 100 | 100 | 100 | 100 | 100 |
| Antiblocking agent | | | | | 5 | | | | | | |
| $AlCl_3 \cdot 6H_2O$ | | | | | | | | 6 | | 6 | |
| $NaAlCl_4$ | | | | | | | | | 5 | | 5 |
| K peroxodisulfate | 4.0 | 4.0 | | | | | | | | | |
| Na peroxodisulfate | | | 3.4 | 3.4 | 3.4 | | | | | | |
| Brüggolit | 2.4 | 2.4 | | | | | | | | | |
| Ascorbic acid | | | 2.7 | 2.7 | 2.7 | | | | | | |
| Film-forming auxiliary | 2.6 | 2.6 | 2.6 | 2.6 | 2.6 | 2.6 | 2.6 | 2.7 | 2.7 | 2.7 | 2.7 |
| Test results | | | | | | | | | | | |
| Adhesive strength (N/mm$^2$) | 2.0 | 1.9 | 2.4 | 2.5 | 2.3 | 0.7 | 0.6 | 2.0 | 1.9 | * | * |
| Powder storage time (d) | 1 | 90 | 1 | 90 | 90 | 1 | 90 | 1 | 1 | 7 | 7 |

Antiblocking agent: hydrite ($Al_4(OH)_8Si_4O_{10}$). Film-forming auxiliary: BGA (butyldiglycol acetate).
Adhesive strength according to DIN EN 204: after storage for 7 days in a normal climate and for 2 days in cold water
Powder storage time: storage time of the powder in a normal climate before processing.
* = no longer redispersible, already crosslinked in the dry state.

We claim:
1. A water-dispersible or water-soluble polymer powder composition which can be crosslinked or condensed by acid and comprises
   I) at least one pulverulent water-dispersible or water-soluble copolymer which can be crosslinked or condensed by acid,
   II) at least one pulverulent water-dispersible or water-soluble compound selected from the group consisting of alkali metal or ammonium peroxo acid salts, and
   III) at least one pulverulent water-dispersible or water soluble reducing agent.

2. A polymer powder composition as claimed in claim 1, which comprises copolymers which have a $T_g$ of $-60°$ C. to $+60°$ C. and comprise
   a) one or more monomer units selected from the group consisting of vinyl esters of unbranched or branched alkylcarboxylic acids having 1 to 15 C atoms, mono- or (5) 70 to 98.9% by weight of vinyl ester, in particular vinyl acetate, and 1 to 30% by weight of (meth)acrylic acid ester,
(6) 50 to 75% by weight of vinyl acetate, 1 to 30% by weight of acrylic acid ester, and 1 to 40% by weight of ethylene,
(7) 30 to 75% by weight of vinyl acetate, 1 to 30% by weight of vinyl esters of α-branched mono carboxylic acids having 9 to 10 C atoms, 1 to 30% by weight of acrylic acid ester and 1 to 40% by weight of ethylene,
(8) 15 to 70% by weight of vinyl acetate, 25 to 80% by weight of vinyl chloride and 4 to 40% by weight of vinyl laurate,
(9) 40 to 80% by weight of vinyl chloride, 9 to 35% by weight of ethylene, 10 to 45% by weight of vinyl laurate and 0 to 40% by weight of vinyl acetate,

(10) 20 to 80% by weight of vinyl chloride, 19 to 40% by weight of ethylene and 0 to 60% by weight of one or more monomers selected from the group consisting of vinyl acetate, n-butyl acrylate and 2-ethylhexyl acrylate,

(11) 20 to 60% by weight of vinyl acetate, 30 to 60% by weight of ethylene and 10 to 40% by weight of one or more monomers selected from the group consisting of diisopropyl maleate, diisopropyl fumarate, di-t-butyl maleate, di-t-butyl fumarate, methyl t-butyl maleate and methyl t-butyl fumarate.

4. A polymer powder composition as claimed in claim 3, which comprises as comonomer units a), in each case based on the total weight of the copolymer, a member selected from the group consisting of:

(1) 90 to 99.9% by weight of vinyl acetate, (2) 49.9 to 98.9% by weight of vinyl acetate, and 1 to 50% by weight of ethylene, (3) 40 to 80% by weight of vinyl acetate, 5 to 45% by weight of vinyl laurate or vinyl ester of an α-branched carboxylic acid, containing 9 or 10 carbon atoms, (4) 70 to 98.9% by weight of vinyl acetate and 1 to 30% by weight of vinyl ester of an α-branched carboxylic acid containing 9 or 10 carbon atoms, (5) 70 to 98.9% by weight vinyl acetate, and 1 to 30% by weight of a member selected from the group consisting of ethyl acrylate, n-butyl acrylate and 2-ethylhexyl acrylate, (6) 50 to 75% by weight of vinyl acetate, 1 to 30% by weight of n-butyl acrylate or 2-ethylhexyl acrylate, and 1 to 40% by weight of ethylene, and (7) 30 to 75% by weight of vinyl acetate, 1 to 30% by weight of vinyl ester of an α-branched carboxylic acid containing 9 or 10 carbon atoms, 1 to 30% by weight of n-butyl acrylate or 2-ethylhexyl acrylate, and 1 to 40% by weight of ethylene.

5. A polymer powder composition as claimed in claim 2, which comprises as comonomer units a), in each case based on the total weight of the copolymer, a member selected from the group consisting of:

(1) 90 to 99.9% by weight of n-butyl acrylate and/or 2-ethylhexyl acrylate, (2) 40 to 59.9% by weight of methyl methacrylate and 59.9 to 40% by weight of n-butyl acrylate and/or 2-ethylhexyl acrylate, (3) 50 to 77% by weight of ethyl acrylate and 3 to 40% by weight of methacrylic acid, and (4) 40 to 64.9% by weight of styrene and 35 to 59.9% by weight of n-butyl acrylate and/or 2-ethylhexyl acrylate.

6. A polymer powder composition as claimed in claim 2 which comprises 0.5 to 3.0% by weight, based on the total weight of the copolymer, of N-methylolacrylamide, N-methylolmethacrylamide, N-(isobutoxymethyl)-acrylamide (IBMA) and/or N-(n-butoxymethyl) acrylamide (NBMA) as comonomer units (b).

7. A polymer powder composition as claimed in claim 1, which comprises 0.5 to 10.0% by weight, based on the weight of component I), of one or more compounds from the group consisting of sodium peroxodisulfate, potassium peroxodisulfate, ammonium peroxodisulfate and ammonium peroxodiphosphate as component II).

8. A polymer powder composition as claimed in claim 1 which comprises 0.5 to 10.0% by weight, based on the weight of component I) of one or more compounds selected from the group consisting of potassium formaldehyde-sulfoxylate, sodium formaldehydesulfoxylate, alkali metal hydrogen sulfite, alkali metal bisulfite, dithionite, sodium thiosulfate, formamidinesulfinic acid, sodium hypophosphite, ascorbic acid, glucose and dihydroxymaleic acid as component III).

9. The polymer powder composition as claimed in claim 8 wherein the alkali metal hydrogen sulfite is potassium hydrogen sulfite or sodium hydrogen sulfite and the alkali metal bisulfite is sodium bisulfite.

10. A process for the preparation of a polymer powder composition as claimed in claim 1, which comprises admixing pulverulent components II) and III) to the crosslinkable or condensible copolymers I) present in powder form.

11. An adhesive composition for textiles and papers comprised of the composition of claim 1.

12. A binder composition for textiles and papers comprised of the composition of claim 1.

* * * * *